Aug. 12, 1969     K. H. EMICH     3,460,908
SAMPLE ADMISSION SYSTEM FOR A FLAME
IONIZATION CONTAMINANT DETECTOR
Filed July 25, 1966
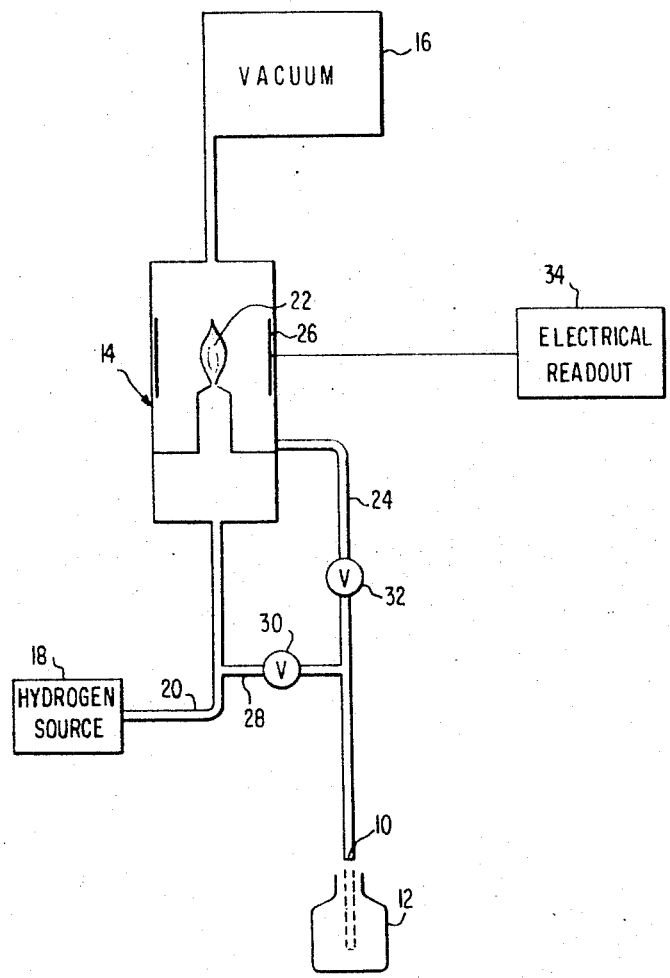
INVENTOR
KARL H. EMICH
BY *Sughrue, Rothwell, Mion, Zinn, & Macpeak*
ATTORNEYS

United States Patent Office 3,460,908
Patented Aug. 12, 1969

3,460,908
SAMPLE ADMISSION SYSTEM FOR A FLAME IONIZATION CONTAMINANT DETECTOR
Karl H. Emich, Decatur, Ill., assignor to National Distillers & Chemical Corporation, New York, N.Y., a corporation of Virginia
Filed July 25, 1966, Ser. No. 567,675
Int. Cl. G01n 27/62
U.S. Cl. 23—232   5 Claims

ABSTRACT OF THE DISCLOSURE

A sample admission system for a flame ionization gaseous organic contaminant detector wherein a portion of the sample gas to be tested is mixed with the flame fuel gas prior to burning.

---

This invention relates to improvements in flame ionization contaminant detectors and particularly to a unique sample admission flow arrangement therefor.

Flame ionization detectors are known in the art and are particularly useful in detecting gaseous organic contaminants in open end reusable food containers such as disclosed in Patent 3,266,292 (Ser. No. 373,310, filed June 8, 1964), assigned to the assignee of this invention. In such a detector a sampling tube or probe continually takes in atmosphere by vacuum pulled through the probe and through a flame ionization detecting cell. The sample from the probe is admitted to the enclosure of the cell and a gas, such as hydrogen, is utilized to create a flame. The sample gas, if it has any organic contaminants, is burned in the hydrogen flame creating a change in ionization on collector plates providing an electrical signal which may be read out.

It has been discovered that the sensitivity of the flame ionization detector cell can be increased by a factor of 10 by a relatively simple expedient of this invention which involves mixing at least a portion of the sample and the hydrogen prior to combustion to get better combustion at the flame and to get more hydrocarbons concentrated in the combustion area of the flame and a better read out. Sensitivity of these detection cells are especially critical when measuring organic contaminants in the order of just a few parts per million of hydrocarbon.

Other features of the invention will be pointed out in the following description and claims and illustrated in the accompanying drawings, which disclose by way of example, the principle of the invention and the best mode which has been contemplated of applying that principle.

In the drawing:

The single figure is a schematic flow diagram of a flame ionization detection cell with the sample admission system of this invention incorporated therein.

Referring to the drawing, the entire contaminant detection system includes a probe or sampler tube 10 which may alternately dip in and be removed from an open end container 12 to sample the atmosphere in the container, although this invention is not limited to the environment of sampling containers. A vacuum is continuously drawn through the open lower end of the probe 12 to withdraw atmosphere whether from within container 12 or from ambient into the flame ionization detection cell 14 by means of vacuum source 16.

The flame ionization detection cell per se is of a type known in the art, for example, that shown in the aforesaid patent. In such flame ionization detectors a source of gaseous fuel such as hydrogen is provided under constant pressure from hydrogen source 18 through line 20 to a burner tip to create a hydrogen flame 22. The sample is admitted through sample line 24 outside the flame 22 and if the sample has any hydrocarbons in it it will change the ionization of the flame when it is burned. The change in ionization is detected at the anode or collector 26 and may be electrically read out by suitable readout means 34.

This invention involves premixing at least a portion of the sample from probe 10 into the hydrogen line 20 prior to combustion. This is accomplished by providing a connecting conduit 28 between the probe 10 and the hydrogen inlet line. The connecting conduit has a restriction 30 which may be a needle valve, orifice or the like in order to specifically control the amount of sample which is mixed with the hydrogen. In addition the sample inlet line 24 may be provided with a variable restriction, such as valve 32 of the needle valve type in order to control the pressure and flow of the sample.

By varying valves 30 and 32 the amount of sample premixed with the flame fuel or hydrogen may be adjusted to provide maximum response of the detector, e.g., about one-third of the total flow of the sample.

Mixing part of the sample with the hydrogen prior to combustion has increased sensitivity of the detection cell by a factor of ten. The reason is not known but it is postulated that mixing the sample and the hydrogen concentrates combustion in the area of the flame and therefore more of the total hydrocarbon content of the sample is combusted, i.e., more goes into the measurement. By admitting all of the sample through line 24 only partial combustion of the sample occurs if it has any hydrocarbon in it and partial combustion has an adverse affect on the sensitivity.

The present invention of mixing a portion of the sample with the incoming hydrogen also eliminates deterioration of the detecting cell 14. These cells have been found to deteriorate with time for some unknown reason. The sample admission system of this invention eliminates such deterioration to the extent that it affects sensitivity and measurement.

While the invention has been particularly shown and described with reference to a preferred embodiment thereof, it will be understood by those skilled in the art that various changes in form and details may be made therein without departing from the spirit and scope of the invention.

I claim:
1. A sample admission system for a flame ionization gaseous organic contaminant detector of the type where an atmospheric sample is passed into a gas fueled flame of the flame ionization detector, the improvements comprising a fluid conduit with flow control means therein between a sample admission line to the detector and a flame fuel admission line, thereby allowing at least a portion of the sample gas to be premixed with the flame fuel gas.

2. A sample admission system as in claim 1 further comprising a fluid conduit with flow control means therein for admitting a controlled portion of the sample directly to the flame in the detector without premixing with the fuel.

3. A sample admission system as defined in claim 2 wherein the flow control means comprise a valve in the fluid conduit for controlling the admission of the sample directly in the pressure thereof.

4. A method of admitting a gaseous sample to a flame ionization gaseous organic contaminant detector of the type utilizing ionization of a gas fuel flame, burning the sample to provide an indication of the organic contaminant in the sample burned, the improvements comprising, premixing a predetermined portion of the gaseous sample with the gas for fueling the flame prior to burning the same.

5. A method as in claim 4 wherein the proportion of the sample admitted to the gas for fueling the flame is approximately one-third of the total amount of sample admitted to the detector.

References Cited

UNITED STATES PATENTS 3,095,278 6/1963 Green.
3,169,832 2/1965 Gallaway et al.

MORRIS O. WOLK, Primary Examiner

R. E. SERWIN, Assistant Examiner

U.S. Cl. X.R.

23—254